Oct. 27, 1970     C. D. TURK ET AL     3,536,539

PRODUCTS COMPOSED OF SUPERPLASTIC CRYSTALLINE MATERIALS

Filed Jan. 11, 1968

Charles D. Turk,
John F. Clarke,
Inventors
Koenig, Senniger, Powers and Leavitt,
Attorneys.

3,536,539
PRODUCTS COMPOSED OF SUPERPLASTIC
CRYSTALLINE MATERIALS
Charles D. Turk, Norwood, and John F. Clarke, North
Attleboro, Mass., assignors to Texas Instruments Incorporated, Dallas, Tex., a corporation of Delaware
Filed Jan. 11, 1968, Ser. No. 697,199
Int. Cl. C21d 1/04
U.S. Cl. 148—12.9      4 Claims

ABSTRACT OF THE DISCLOSURE

Metals, ceramics and like crystalline materials, capable of superplasticity or of acquiring it, are subjected to energy input by application of ultrasonic vibrations. The ultrasonic vibrations are applied during deformation of the material at the strain rates and at temperatures which are acceptable in commercial forming operations.

---

A superplastic material is one having unusual ductility, in the sense that only comparatively small deforming forces are required to produce substantially uniform deformation throughout the volume of the material without incurring high stresses such as would ordinarily reach the breaking point of the material. The phenomenon is not restricted to metals but is applicable to all crystalline material including ceramics.

It is known that the introduction of ultrasonic energy during deformation of a conventional crystalline structure of comparatively coarse structure will somewhat increase its plasticity at various conventional strain rates, but it will not make it superplastic. As indicated below, superplastic crystalline materials involve a problem in that they require low strain rates even at high temperatures such as are not practical in commercial deforming procedures such as die-forming, drawing or the like.

Superplasticity is dependent upon modes of deformation which appear to be somewhat involved with and controlled by diffusion. The application of ultrasonic energy enhances diffusion so that it may occur at a lower temperature than that at which the usually fine-grained structure needed for superplasticity is obtained. The application of ultrasonic energy to superplastic materials appears also to enhance grain boundary shear by supplying energy to round the grain or other structural boundary ledges and obstructions in the fine structure. This increases the superplasticity. An advantage of superplasticity in a material is the avoidance of localized stresses in products made therefrom by deformation processes.

Without the application of ultrasonic energy to superplastic crystalline materials, they are unduly sensitive to normally employed strain rates used in conventional forming processes, even at temperatures in excess of those usually occurring in the materials during such processes. Thus materials which exhibit superplasticity ordinarily exhibit the property only under an unduly limited strain rate and at an unduly high temperature. Thus, in order to preserve superplasticity while deforming a superplastic material, the strain rates required are usually substantially below, and the temperatures above, those acceptable in commercial operations. Thus an advantage of the invention is the ability to deform a superplastic material under commercial conditions, such as by rapid conventional drawing, pressing and like operations under acceptably low (conventional) temperatures, without incurring localized stresses which might be deleterious in the finished product. Other objects and features will be in part apparent and in part pointed out hereinafter.

Figure 1:
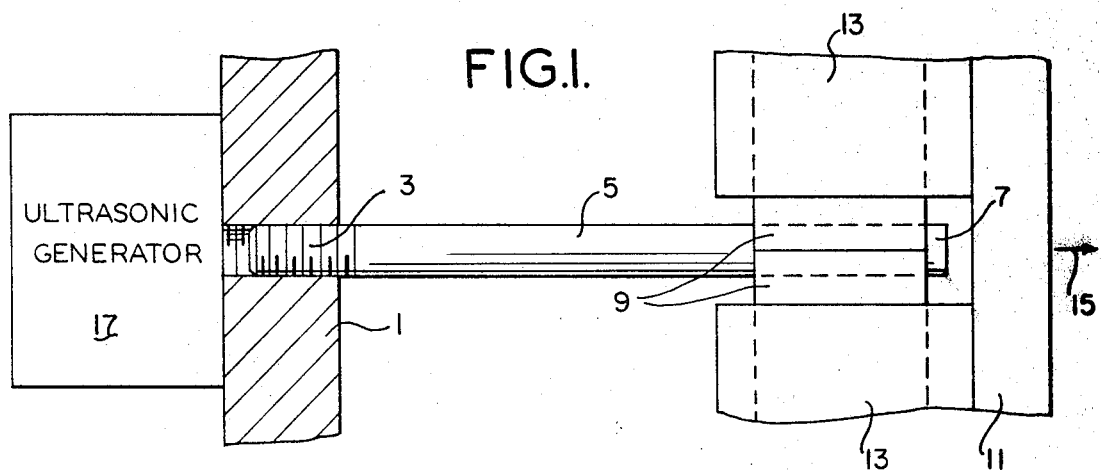
Figure 2:
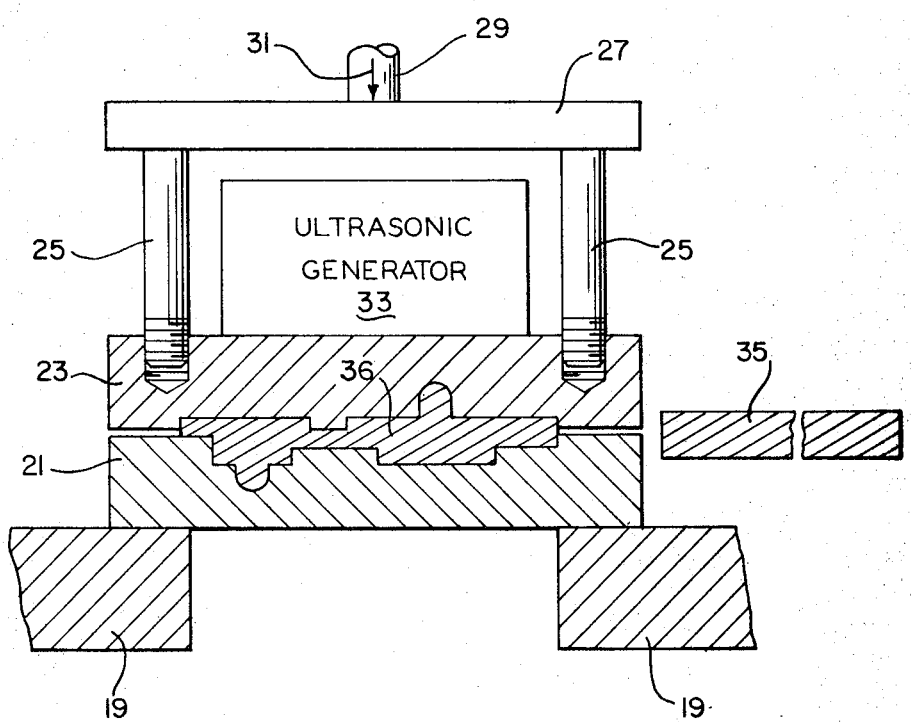

FIG. 1 illustrates one form of the invention in which a material is deformed under tension; and FIG. 2 illustrates another form of the invention in which a material is deformed under compression.

Corresponding reference characters indicate corresponding parts throughout the several views of the drawings. The drawings being illustrated are not to scale.

Referring to FIG. 1, numeral 1 indicates a fixed member having a threaded fixed connection 3 anchoring one end of a superplastic workpiece 5. The other movable end 7 of the workpiece 5 is gripped by jaws 9 of a draw bar 11. The jaws 9 are adjustable in members 13 attached to the draw bar 11, the adjusting means (not shown) being of a known type. Thus the jaws 9 may be gripped on the workpiece 5. The dart 15 indicates the direction in which the draw bar 11 may be pulled to apply tension to the piece 5. Attached to the fixed member 1 is an ultrasonic generator 17 designed to operate at a frequency of approximately twenty kilocycles (20 kc.), which is to say twenty thousand cycles per second (20,000 c.p.s.). The generator is designed to deliver energy to the piece 5 in the range of one to 5000 watts per square centimeter (1 to 5000 w./cm.$^2$).

In FIG. 2 is shown a support 19 for a fixed lower die 21. A movable die is shown at 23 carried on posts 25 attached to a ram 29. The dart 31 indicates the direction of the compressive force. Attached to the die 23 is an ultrasonic generator 33, designed to apply ultrasonics at a frequency of approximately 20 kc. in the range of 1 to 5000 w./cm.$^2$. At the right-hand side of FIG. 2 at numeral 35 is indicated a blank of appropriate volume of superplastic material to be inserted between the dies 21 and 23 so that when the dies are brought together the material will completely infill the opposed die recesses in order to form the part desired. The finished part ready for removal from the dies is shown at 36. It is to be understood that an ultrasonic generator may be attached to either or each of the members which produce deformation in the workpiece 5 or 35.

The materials constituting the pieces such as 5 or 35 must be in a superplastic condition, as distinguished from being merely plastic in the usual sense. For example, they may be composed of a eutectoid alloy consisting of zinc containing approximately 22% aluminum. This alloy system assumes a superplastic condition at a temperature of about 270° C. which is slightly below the eutectoid transformation temperature of 275° C., after being quenched from about 360° C. which temperature is above the eutectoid transformation temperature which produces a fine structure therein. The fine structure is obtained by heating to about 360° C., holding for a period of time (about 24 hours) and quenching to room temperature. This fine structure remains upon cooling. If this material were then to be taken back up to about 270° C. it would become superplastic under deformation but the permisisble strain rate would be very low, requiring hours. These are disadvantages since ordinary commercial deformation operations in order to be economical do not occur at such low strain rates nor at such a high temperture as 270° C. (for the zinc-aluminum alloy).

Thus, according to the invention, instead of taking a material treated to be superplastic back up to the (commercially) high temperature, we apply the ultrasonic energy during deformation (strain). The ultrasonic application of energy substitutes for energy which would otherwise need to be supplied by heat to bring about the high temperature. As a result of the invention the need for the high temperature is eliminated. Moreover the requirement for unduly low strain rates during deformation is eliminated and deformations can be carried out under the much faster commercially formed conditions. Thus for the first time superplastic conditions can be maintained under practical deforming processes.

The example of the zinc-22% aluminum eutectoid alloy is only one example of a crystalline material which may be used, since almost any such material which can be given a fine structure may be used. For example there are superplastic steels which may be used. These are rolled at a phase transformation temperature to bring about conditions such as fine structure for superplasticity.

It will be understood that in some cases metallurgical or other systems of materials when obtained by the user already have qualities such as fine structure to bring them into the superplastic condition. It should be noted that it is generally believed in the present state of the art that fine structure is in all cases a condition for superplasticity. This may or may not be true, but if not in certain instances, then some other at present unknown condition accounts for it.

Advantages of the invention are that various superplastic materials may be worked in drawing, working, die pressing and like conventional processes without the need for using high temperatures or impracticably slow rates of deformation. A further advantage of the invention is that the resulting products do not contain localized high stress regions which tend toward breakage under stresses applied in use. For example in stretching a piece such as fiber in FIG. 1, without the use of the invention it would ordinarily neck down and even break if the stretching is carried too far and too fast. The neck down region in any event is the location of a high stress region. In the application illustrated in FIG. 2 the invention has a further advantage that the superplastic material contained in the die will under the application of ultrasonic energy flow freely into and accurately infill the entire die space, regardless of how complex it may be. Again, the introduction of localized regions of stress are avoided.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. The method of forming a comparatively low-stressed product, comprising applying a deforming force to a mass of a preselected zinc-aluminum crystalline material in a condition of superplasticity, said material having a normally limited strain rate even at high temperatures, and contemporaneously applying ultrasonic energy to the material, whereby said deforming force may be applied at a substantially lower temperature and at a strain rate substantially greater than said limited rate.

2. The method according to claim 1, wherein said ultrasonic energy is supplied at a frequency of approximately 20 kilocycles at an intensity of delivery to the material in the range of approximately 1 to 5000 watts per square centimeter.

3. The product made according to claim 1.

4. The product made according to claim 2.

References Cited

UNITED STATES PATENTS

| | | | |
|---|---|---|---|
| 3,201,967 | 8/1965 | Balamuth et al. | 72—56 |
| 3,340,101 | 9/1967 | Fields et al. | 72—60 |
| 3,354,688 | 11/1967 | Bodine | 72—56 |

OTHER REFERENCES

"Metals Gain New Formability With Ultrasonic Boost," by A. W. Young, Iron Age, pp. 73–76, Mar. 25, 1965.

L. DEWAYNE RUTLEDGE, Primary Examiner

W. W. STALLARD, Assistant Examiner